(12) United States Patent
Nakanishi et al.

(10) Patent No.: US 7,025,542 B2
(45) Date of Patent: Apr. 11, 2006

(54) GUIDE DEVICE FOR WORKPIECE MACHINING HEAD, MACHINE HAVING THE SAME, AND GUIDE METHOD

(75) Inventors: Atsuo Nakanishi, Suzuka (JP); Yoshio Ogawa, Suzuka (JP); Toshiaki Takagi, Suzuka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/885,348

(22) Filed: Jul. 6, 2004

(65) Prior Publication Data

US 2006/0008331 A1    Jan. 12, 2006

(51) Int. Cl.
 *B23B 47/00* (2006.01)
(52) U.S. Cl. .................... 408/110; 408/1 R; 408/129; 408/234
(58) Field of Classification Search ............... 408/1 R, 408/130, 4, 46, 51, 53, 110, 115 R, 129, 234, 408/709
 See application file for complete search history.

(56) References Cited

U.S. PATENT DOCUMENTS

| | | | | |
|---|---|---|---|---|
| 3,260,137 A | * | 7/1966 | Obmann | 408/14 |
| 4,245,938 A | * | 1/1981 | Kriegl et al. | 409/15 |
| 4,279,552 A | * | 7/1981 | Epstein | 408/112 |
| 4,585,376 A | * | 4/1986 | Davenport et al. | 408/110 |
| 4,669,926 A | * | 6/1987 | Wilcox, Jr. | 408/1 R |
| 4,913,447 A | * | 4/1990 | Jostlein | 277/304 |
| 4,917,549 A | * | 4/1990 | Geernaert | 408/42 |
| 5,078,558 A | * | 1/1992 | Arai et al. | 409/233 |
| 5,108,236 A | * | 4/1992 | Arai et al. | 409/163 |
| 5,168,186 A | * | 12/1992 | Yashiro | 310/47 |
| 5,205,682 A | * | 4/1993 | Jinkins | 408/46 |
| 5,445,478 A | * | 8/1995 | Ordogh et al. | 408/1 R |
| 5,630,685 A | * | 5/1997 | Susnjara et al. | 409/231 |
| 6,099,213 A | * | 8/2000 | Kammeraad et al. | 408/14 |
| 6,227,777 B1 | * | 5/2001 | Kosmowski | 409/231 |
| 6,514,018 B1 | * | 2/2003 | Martinez et al. | 408/14 |
| 6,569,071 B1 | * | 5/2003 | Koren et al. | 483/32 |
| 6,640,679 B1 | * | 11/2003 | Roberts, Jr. | 82/165 |
| 6,729,809 B1 | * | 5/2004 | Sarh et al. | 408/1 R |
| 2004/0057805 A1 | * | 3/2004 | Azema | 408/234 |

FOREIGN PATENT DOCUMENTS

| JP | 07164222 A | * | 6/1995 |
|---|---|---|---|
| JP | 2003062732 A | * | 3/2003 |

* cited by examiner

*Primary Examiner*—Derris H. Banks
*Assistant Examiner*—Michael W. Talbot
(74) *Attorney, Agent, or Firm*—Rankin, Hill, Porter & Clark LLP

(57) ABSTRACT

There is provided a guide device for a machining head capable of machining a workpiece such as a cylinder head of an engine accurately, a machine having the guide device, and a guide method. At least one of guide posts formed in a guide post member has an air pressure controlling function capable of fitting and holding a guide bar in the guide post in a non-contact state, and other guide bars have a very small clearance with the guide post facing to the guide bar. Thereby, the position at which the machining head is held is accurately held.

24 Claims, 2 Drawing Sheets

GUIDE DEVICE FOR WORKPIECE MACHINING HEAD, MACHINE HAVING THE SAME, AND GUIDE METHOD

BACKGROUND OF THE INVENTION

1. Field of the Invention

The present invention relates to a machining head capable of simultaneously performing cutting and boring of a workpiece such as a cylinder head of an engine. More particularly, it relates to a guide device for a machining head capable of machining a workpiece accurately, a machine having the guide device, and a guide method.

2. Description of the Related Art

In a machine of a type having a guide bar attached to a machining head and a guide post for guiding the guide bar, a clearance formed when the guide bar is fitted in the guide post produces vibrations at the time of workpiece machining. This presents a problem in that the vibrations make it difficult to perform accurate machining, and exert a remarkable influence on the roundness of workpiece especially in boring operation.

Also, the machining head is heavy because it is equipped with many cutting tools, boring tools, etc. in a state of being operable, so that a head-down state is formed when horizontal movement toward the workpiece is repeated. If this state occurs, the clearance between the guide bar and the guide post on the lower side, which is usually about 0.01 to 0.02 mm, is lost, and therefore the guide bar and the guide post are brought into contact with each other when they are fitted to each other, and hence they are worn. As a result, the clearance on the upper side increases, and the machining head lowers relatively, which presents a problem of degraded machining accuracy of workpiece.

To solve such problems, the applicant has proposed a system in which a member for locking the guide bar is contracted by hydraulic pressure, and the machining head and a rotary jig for holding a workpiece are integrated (refer to Japanese Patent Laid-Open No. 7-164222, Abstract and FIG. 6).

The hydraulic system disclosed in Japanese Patent Laid-Open No. 7-164222 has a problem in that the structure is complicated in order to prevent hydraulic fluid from leaking although the effect is high.

SUMMARY OF THE INVENTION

An object of the present invention is to provide a guide device for a machining head capable of machining a workpiece such as an engine block accurately, a machine having the guide device, and a guide method.

The present invention provides a guide device for a workpiece machining head, comprising a plurality of guide bars provided on the machining head provided with a machining tool, and a guide post member which is arranged between the machining head and a rotary jig for holding a workpiece to be machined and has a plurality of guide posts capable of being fitted to the guide bars, wherein the guide bars include at least a pair of guide bars provided at an interval on the machining head and a single guide bar provided at a distance from the paired guide bars, and the guide post which fits to the single guide bar has an air pressure controlling function capable of fitting and holding the guide bar in the guide post in a non-contact state.

The single guide bar is preferably provided at a substantially equal distance from the paired guide bars. Also, the non-contact state is not formed by an air pressure until the single guide bar is completely fitted in the guide post, so that the single guide bar and the paired guide bars come into contact with the inner peripheral surface of the guide post. Therefore, at least the outer peripheral surface of the guide bar and the inner peripheral surface of the guide post, i.e., the surfaces on which the guide bar and the guide post come into contact with each other are preferably formed of a wear-resistant material such as a steel including wear resistance improving means such as hardening.

The single guide bar and the guide post having the air pressure controlling function, which faces to the single guide bar, are preferably fitted to each other and held with a clearance of 0.02 to 0.1 mm, preferably about 0.03 mm. The air pressure controlling function can preferably discharge air from the inner peripheral surface of the guide post at a pressure in the range of 2 to 10 kg/cm$^2$, preferably at about 5.5 kg/cm$^2$. Also, nozzles for discharging air are formed at substantially equal intervals in the inner peripheral surface of the guide post in both of the longitudinal direction and the circumferential direction.

A machine in accordance with the present invention is a machine having the guide device in accordance with the present invention, and includes what is called a multi-spindle head machine having a plurality of machining heads.

The present invention provides a guide method for a workpiece machining head, which is carried out by using a plurality of guide bars provided on the machining head provided with a machining tool, and a guide post member which is arranged between the machining head and a rotary jig for holding a workpiece to be machined and has a plurality of guide posts capable of being fitted to the guide bars, wherein when the machining head is brought closer to the workpiece, a pair of guide bars provided at an interval on the machining head are first fitted in the facing guide post, and a single guide bar provided at a distance from the paired guide bars is later fitted in the facing guide post; and a guide post facing to the single guide bar is supported in an airborne manner by an air pressure controlling function capable of fitting and holding the guide bar in the guide post in a non-contact state.

The fitting of the guide bars in the guide posts is performed in order because it is difficult for three or more guide bars to be fitted in the guide posts simultaneously. It is optional to fit the single guide bar first and the paired guide bars later. However, if the single guide bar is fitted first, there is a fear that the single guide bar, which should be kept in the non-contact state, comes into contact with the guide post. Therefore, it is preferable that the paired guide bars be fitted first.

DETAILED DESCRIPTION OF THE PREFERRED EMBODIMENTS

Figure 1:
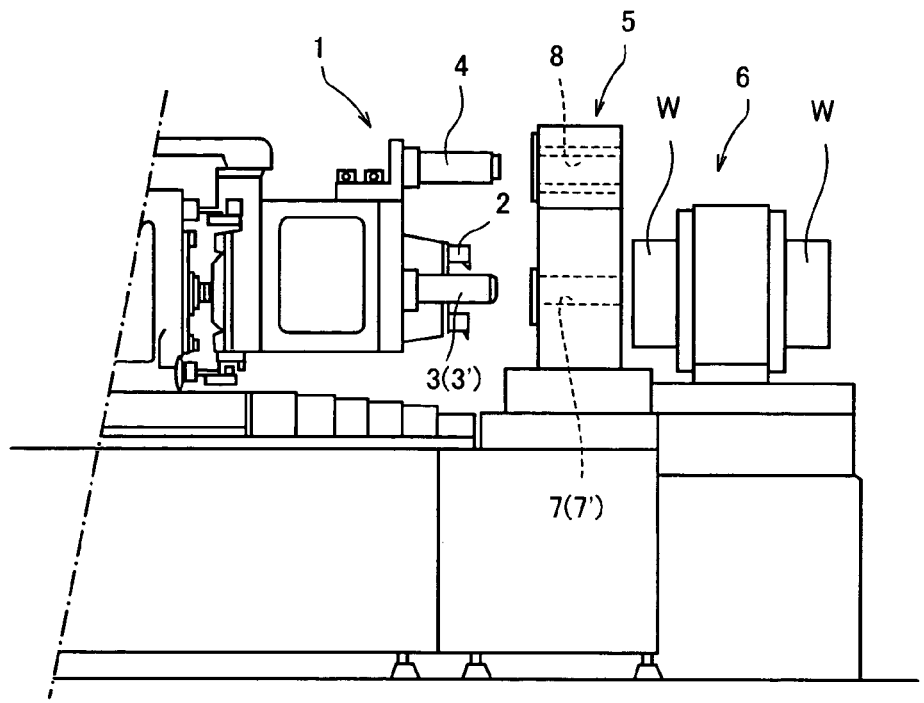
FIG. 1 is a partial front view showing one example of a machine in accordance with the present invention.

An embodiment of the present invention will now be described with reference to the accompanying drawings. FIG. 1 is a partial front view showing one example of a machine in accordance with the present invention. In FIG. 1, a machining head 1 has a plurality of machining tools 2 for cutting, boring, etc. on a seating thereof. Also, a pair of guide bars 3, 3' (the guide bar 3' is not shown because it laps on the guide bar 3 in the figure; however, it is arranged at an interval on the far side of the guide bar 3) are arranged in parallel, and a single airborne guide bar 4 is arranged above the machining head 1 at a substantially equal distance from the guide bars 3, 3'. For the guide bars 3, 3' and 4, a material that is manufactured by hardening the surface of steel (SK carbon tool steel) is preferably used considering the wear resistance.

A guide post member 5 located at a position facing to the machining head 1 is provided with guide posts, described later. A guide device in accordance with the present invention means a device consisting of the guide bars 3, 3', the guide bar 4, and the guide post 5. A rotary jig 6 is provided to hold a workpiece W. The workpiece W held by the rotary jig 6 is brought closer to the machining tools 2 on the machining head 1 held by the guide post member 5, and subjected to predetermined machining operations to manufacture a product.

Figure 2:
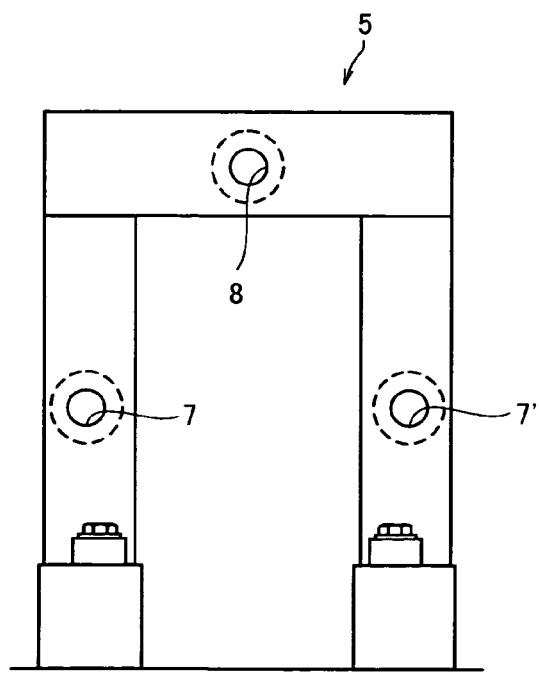
FIG. 2 is a side view showing one example of a guide post member in accordance with the present invention.

FIG. 2 is a side view showing one example of the guide post member in accordance with the present invention. In FIG. 2, guide posts 7, 7' are formed in the guide post member 5 so as to be fitted to the guide bars 3, 3', respectively, and an airborne guide post 8 is formed so as to be fitted to the guide bar 4. These guide bars are preferably formed of a wear resistant material like the guide bars. When the guide bars 3, 3' are fitted in the guide posts 7, 7', a clearance therebetween should be as small as 0.01 to 0.02 mm to ensure the machining accuracy. On the other hand, a clearance between the guide bar 4 and the guide post 8 may be 0.02 to 0.1 mm, preferably about 0.03 mm, to ensure sufficient machining accuracy because the guide bar 4 can be held accurately by the later-described air pressure controlling function.

Figure 3:
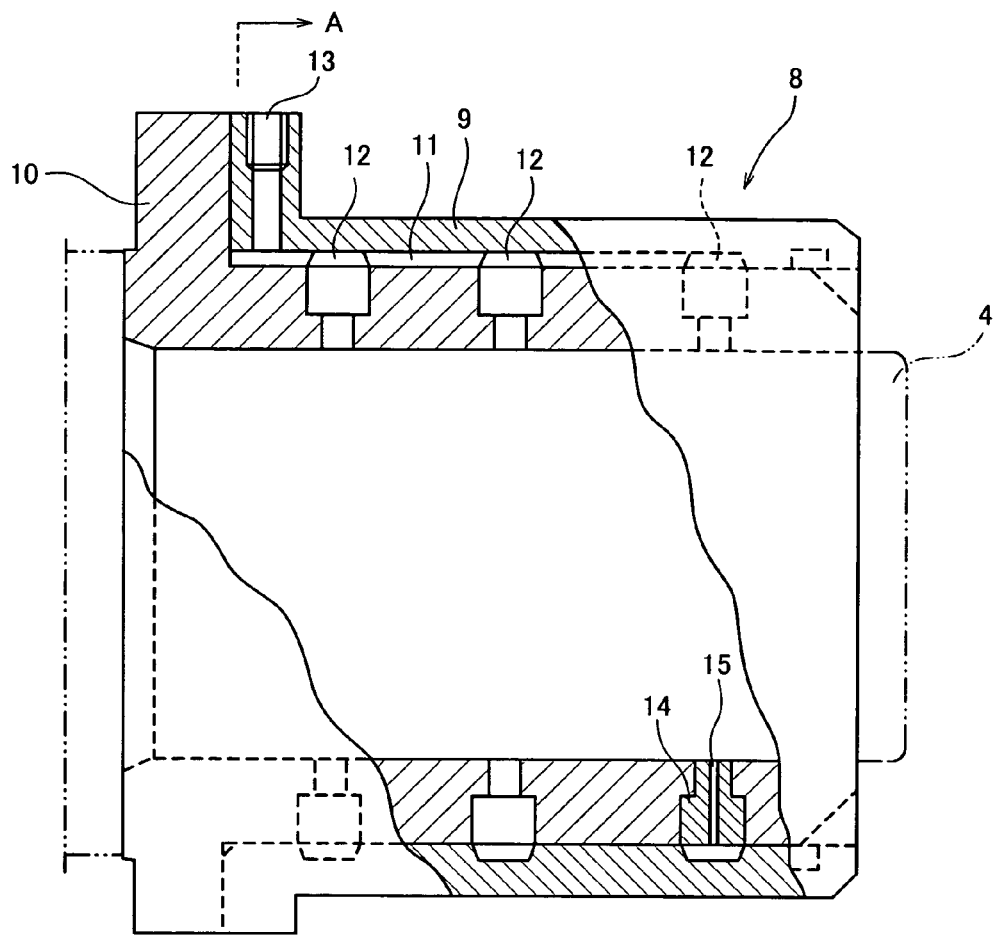
FIG. 3 is a sectional view showing one example of an airborne guide post in accordance with the present invention.

FIG. 3 is a sectional view showing one example of the airborne guide post in accordance with the present invention. The guide post 8 can ensure sufficient machining accuracy with a clearance of 0.02 to 0.1 mm, preferably about 0.03 mm, being provided by the later-described air pressure controlling function as described above. The reason for this is described in detail below.

The guide post 8 has a double structure consisting of an outer cylinder 9 and an inner cylinder 10. Between the outer cylinder 9 and the inner cylinder 10, an inner groove 11 cut in the inner peripheral surface of the outer cylinder 9 is provided. The inner groove 11 is connected with a plurality of air supply grooves 12 for supplying air to the inner peripheral surface of the inner cylinder 10, i.e., the inner peripheral surface of the guide post 8, and an air introduction hole 13 for introducing air, which is sent from a not illustrated air supply source, into the guide post 8. Each of the air supply grooves 12 is combined with an air discharging nozzle 14 formed in the inner cylinder 10 so that air is discharged from a nozzle hole 15 onto the inner peripheral surface of the guide post 8. Thereby, the guide bar 4 that is being fitted or has been fitted in the guide post 8 can be held accurately in a non-contact state.

In FIG. 3, a total of nine nozzles 14 are used: in the longitudinal direction, three nozzles 14 are arranged at substantially equal intervals, and in the circumferential direction, three nozzles 14 are arranged at three equal intervals, i.e., every 60 degrees of angle of circumference, though not shown in the figure. In the present invention, however, the number and arrangement of these nozzles 14 can be changed as necessary.

Figure 4:
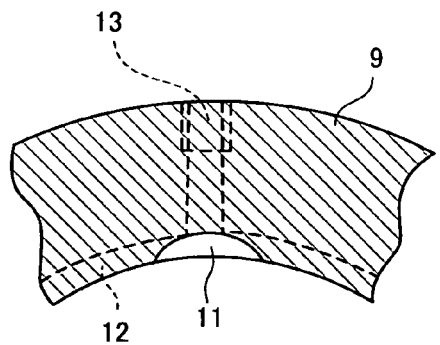
FIG. 4 is a partial sectional view showing one example of an airborne guide post in accordance with the present invention.

FIG. 4 is a partial sectional view showing one example of the airborne guide post in accordance with the present invention. That is, FIG. 4 is a view taken in the direction of the arrow A in FIG. 3, clearly showing a positional relationship between the inner groove 11, the air supply groove 12, and the air introduction hole 13 in the outer cylinder 9. As shown in FIG. 4, air introduced through the air introduction hole 13 is sent into the inner groove 11, and discharged from the nozzle hole 15 onto the inner peripheral surface of the inner cylinder 10 through the air supply groove 12 as explained with reference to FIG. 3. The air pressure controlling function in accordance with the present invention means a series of elements ranging from the air supply source (not shown) to the air introduction hole 13, the inner groove 11, the air supply groove 12, and the nozzle 14. As the air supply source, any device that can generate compressed air may be used, provided that the device can keep the air pressure at 2 to 10 kg/cm$^2$, more specifically 5.5 kg/cm$^2$, for example, at the stage at which the guide bar 4 is inserted into the guide post 8 and in the state in which the guide bar 4 is fitted in the guide post 8. For the nozzle 14 as well, the number and arrangement locations thereof, the inside diameter of the nozzle hole 15, and others must be adjusted appropriately to keep the above-described air pressure.

The guide device for a machining head in accordance with the present invention is used as described below.

In order to machine the workpiece W, the workpiece W is held by the rotary jig 6, and the machining head 1 provided with the machining tools 2 capable of performing intended machining operations via the guide post member 5 is set. When the machining head 1 begins to move toward the workpiece W, first, the guide bars 3, 3' begin to be inserted into the guide posts 7, 7', and after some delay, the guide bar 4 begins to be inserted into the guide post 8. Before the insertion of the guide bar 4, air whose pressure is kept at 5.5 kg/cm$^2$, for example, is discharged onto the inner peripheral surface of the guide post 8.

After the guide bars 3, 3' and 4 have been fitted in the corresponding guide posts 7, 7' and 8, the guide bar 4 is supported by the air whose pressure is kept at 5.5 kg/cm$^2$, for example, in the state in which the guide bar 4 is not in contact with the guide post 8. Also, for the guide bars 3, 3', the clearances with the guide posts 7, 7' are as small as 0.01 to 0.02 mm. Thus, the machining head 1 is supported at three points accurately by the fitting of the guide bars in the guide posts. The number of guide bars and guide posts is not limited to three, respectively. If at least one guide bar is supported by air at the fitting time, the number of other guide bars is not subject to any special restriction. If a plurality of guide bars are supported by air, other guide bars need not be provided.

The machining head 1 supported at three points accurately as described above is brought closer to the rotary jig 6 holding the workpiece W, by which predetermined machining operations such as cutting and boring is performed with high accuracy by the machining tools 2 attached to the machining head 1.

The guide device in accordance with the present invention has the guide bar capable of being held by air. Therefore, even in a state in which the machining head is lowered slightly by the repeated use, the position can be corrected so as to be exact by the guide bar held by air. As a result, machining can be performed with high accuracy.

According to the guide device in accordance with the present invention, the timing of fitting of the airborne guide bar is delayed from the timing of fitting of other non-airborne guide bars having a stringent clearance with the guide post, so that correction for exact position can be made easily.

The machine having the above-described guide device can perform accurate machining for a long period of time, and hence it is well-suited for machining of products in all fields requiring precision machining, including automotive parts such as a cylinder head of an engine.

The invention claimed is:

1. A guide device for a workpiece machining head, comprising:
    a plurality of guide bars extending from said machining head, said machining head also being provided with a machining tool,
    a guide post member, arranged between said machining head and a rotary jig for holding a workpiece to be machined, wherein said guide post member includes a plurality of guide posts into which said guide bars are inserted when the machining head is moved toward the workpiece,
    wherein said guide bars include at least a pair of guide bars provided at an interval on said machining head and a single guide bar provided at a distance from said pair of guide bars, and
    wherein said guide post which fits to said single guide bar has an air pressure controlling function capable of fitting and holding said single guide bar in a non-contact state.

2. The guide device for a workpiece machining head according to claim 1, wherein said single guide bar is provided at a substantially equal distance from each of said paired guide bars.

3. The guide device for a workpiece machining head according to claim 1, wherein at least an outer peripheral surface of said guide bar and an inner peripheral surface of said guide post are formed of a wear-resistant material.

4. The guide device for a workpiece machining head according to claim 1, wherein said single guide bar and said guide post having the air pressure controlling function, which faces to said single guide bar, are fitted to each other and held with a clearance of 0.02 to 0.1 mm.

5. The guide device for a workpiece machining head according to claim 4, wherein said air pressure controlling function can discharge air from an inner peripheral surface of said guide post at a pressure in the range of 2 to 10 kg/cm2.

6. The guide device for a workpiece machining head according to claim 5, wherein nozzles for discharging air are formed at substantially equal intervals in the inner peripheral surface of said guide post.

7. A machine, comprising:
    a machining head, said machining head comprising a machining tool and a plurality of guide bars, said plurality of guide bars extending from said machining head and including a pair of guide bars and a single guide bar, each of said guide bars being spaced from said machining tool;
    a rotary jig adapted to hold a workpiece to be machined by said machining tool; and,
    a guide post member arranged between said machining head and the rotary jig, wherein said guide post member includes a plurality of guide posts into which said guide bars are inserted when the machining head is moved toward the workpiece;
    wherein said guide post which fits to said single guide bar has an air pressure controlling function capable of fitting and holding said single guide bar in a non-contact state.

8. A guide method for a workpiece machining head, which is carried out by using a plurality of guide bars provided on said machining head provided with a machining tool, and a guide post member which is arranged between said machining head and a rotary jig for holding a workpiece to be machined and has a plurality of guide posts capable of being fitted to said guide bars, wherein when said machining head is brought closer to said workpiece, a pair of guide bars provided at an interval on said machining head are first fitted in the facing guide post, and a single guide bar provided at a distance from said paired guide bars is later fitted in the facing guide post; and a guide post facing to said single guide bar is supported in an airborne manner by an air pressure controlling function capable of fitting and holding said guide bar in said guide post in a non-contact state.

9. The guide device for a workpiece machining head according to claim 2, wherein at least an outer peripheral surface of said guide bar and an inner peripheral surface of said guide post are formed of a wear-resistant material.

10. The guide device for a workpiece machining head according to claim 2, wherein said single guide bar and said guide post having the air pressure controlling function, which faces to said single guide bar, are fitted to each other and held with a clearance of 0.02 to 0.1 mm.

11. The guide device for a workpiece machining head according to claim 10, wherein said air pressure controlling function can discharge air from an inner peripheral surface of said guide post at a pressure in the range of 2 to 10 kg/cm2.

12. The guide device for a workpiece machining head according to claim 11, wherein nozzles for discharging air are formed at substantially equal intervals in the inner peripheral surface of said guide post.

13. The guide device for a workpiece machining head according to claim 3, wherein said single guide bar and said guide post having the air pressure controlling function, which faces to said single guide bar, are fitted to each other and held with a clearance of 0.02 to 0.1 mm.

14. The guide device for a workpiece machining head according to claim 13, wherein said air pressure controlling function can discharge air from the inner peripheral surface of said guide post at a pressure in the range of 2 to 10 kg/cm2.

15. The guide device for a workpiece machining head according to claim 14, wherein nozzles for discharging air are formed at substantially equal intervals in the inner peripheral surface of said guide post.

16. The guide device for a workpiece machining head according to claim 9, wherein said single guide bar and said guide post having the air pressure controlling function, which faces to said single guide bar, are fitted to each other and held with a clearance of 0.02 to 0.1 mm.

17. The guide device for a workpiece machining head according to claim 16, wherein said air pressure controlling function can discharge air from the inner peripheral surface of said guide post at a pressure in the range of 2 to 10 kg/cm2.

18. The guide device for a workpiece machining head according to claim 17, wherein nozzles for discharging air are formed at substantially equal intervals in the inner peripheral surface of said guide post.

19. The guide device for a workpiece machining head according to claim 1, wherein each of said plurality of guide bars are spaced from the machine tool.

20. The machine according to claim 7, wherein said single guide bar is provided at a substantially equal distance from each of said paired guide bars.

21. The machine according to claim 7, wherein at least an outer peripheral surface of said guide bars and an inner peripheral surface of said guide posts are formed of a wear-resistant material.

22. The machine according to claim 7, wherein said single guide bar and said guide post having the air pressure controlling function, which faces to said single guide bar, are fitted to each other and held with a clearance of 0.02 to 0.1 mm.

23. The machine to claim 22, wherein said air pressure controlling function can discharge air from an inner peripheral surface of said guide post at a pressure in the range of 2 to 10 kg/cm2.

24. The machine to claim 23, wherein nozzles for discharging air are formed at substantially equal intervals in the inner peripheral surface of said guide post.

* * * * *